United States Patent [19]
Deng et al.

[11] Patent Number: 5,627,446
[45] Date of Patent: May 6, 1997

[54] INDUCTION MOTOR CONTROL METHOD

[75] Inventors: Doug Deng; Xingyi Xu, both of Canton, Mich.

[73] Assignee: Ford Motor Company, Dearborn, Mich.

[21] Appl. No.: 498,163

[22] Filed: Jul. 5, 1995

[51] Int. Cl.⁶ ................................................. H02P 5/402
[52] U.S. Cl. ......................... 318/799; 318/801; 318/805; 318/812
[58] Field of Search ................................. 318/727, 767, 318/798, 799, 800, 801, 805, 806, 812

[56] References Cited

U.S. PATENT DOCUMENTS

| | | |
|---|---|---|
| 4,052,648 | 10/1977 | Nola . |
| 4,379,258 | 4/1983 | Sugimoto .................. 318/805 |
| 4,672,286 | 6/1987 | Williams . |
| 4,680,525 | 7/1987 | Kobari et al. . |
| 4,800,327 | 1/1989 | Fujioka et al. . |
| 4,808,903 | 2/1989 | Matsui et al. . |
| 4,912,386 | 3/1990 | Lurie ......................... 318/615 |
| 4,958,117 | 9/1990 | Kerkman et al. ............ 318/805 |
| 5,038,092 | 8/1991 | Asano et al. . |
| 5,066,899 | 11/1991 | Nashiki . |
| 5,119,007 | 6/1992 | Tunehiro et al. . |
| 5,264,773 | 11/1993 | Koyama et al. . |
| 5,274,317 | 12/1993 | Utley et al. . |

Primary Examiner—Bentsu Ro
Attorney, Agent, or Firm—Mark S. Sparschu

[57] ABSTRACT

In one embodiment of the present invention, a control method for an induction motor includes calculating a desired quadrature-axis voltage and a desired direct-axis voltage according to both current control and voltage control. Below a predetermined motor speed, the motor is controlled in accordance with current control only. Above that predetermined speed, the two desired quadrature-axis voltages are combined in relative proportions, with the influence of voltage control being greater with higher motor speed. The two desired direct-axis voltages are likewise combined. The influence of voltage control thus increases with increasing motor speed. Above a second motor speed threshold, the motor is controlled in accordance with voltage control only.

8 Claims, 1 Drawing Sheet

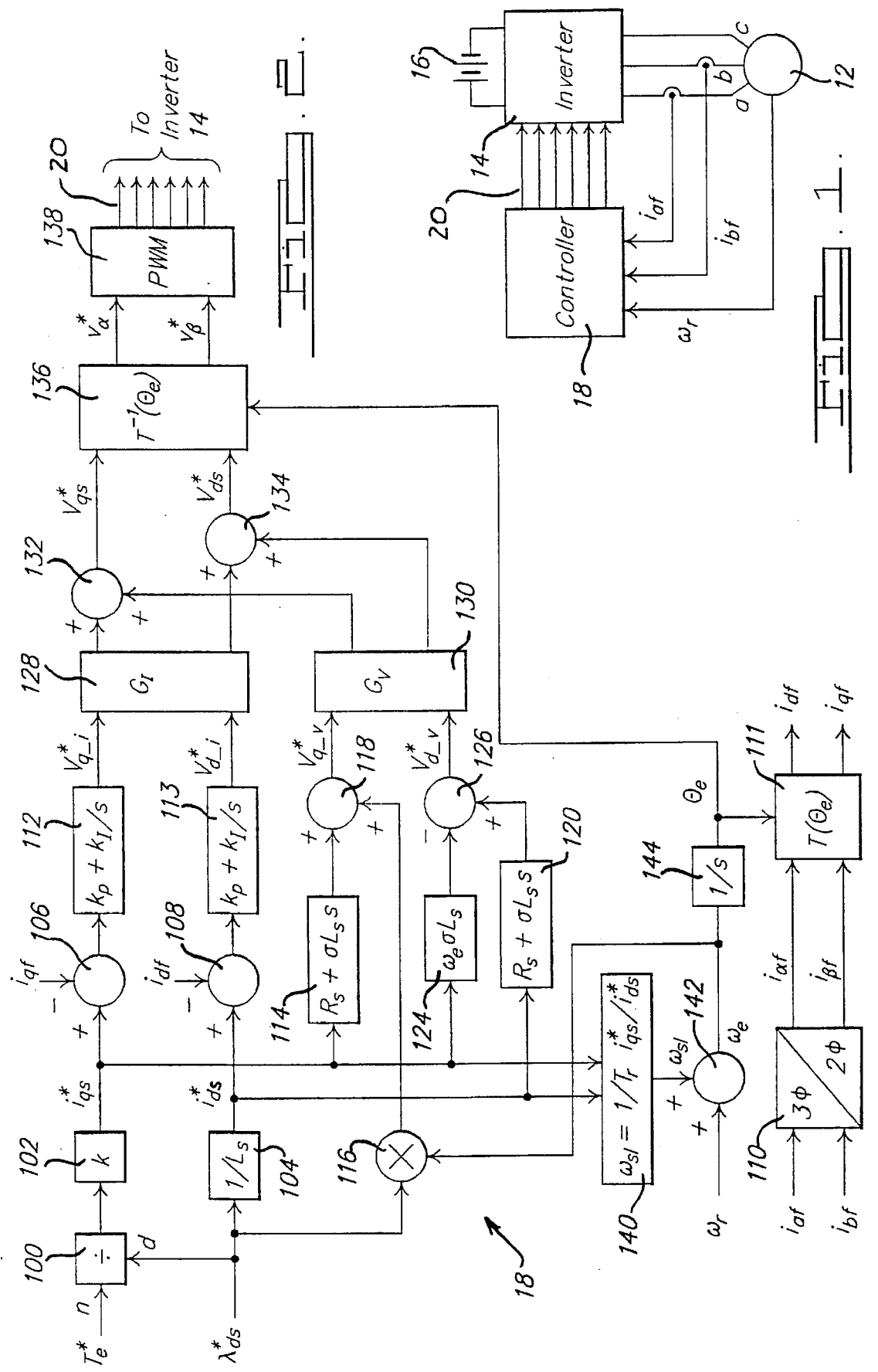

INDUCTION MOTOR CONTROL METHOD

BACKGROUND OF THE INVENTION

1. Field of the Invention

The present invention relates to induction motor control.

2. Description of the Related Art

One application for induction motors is in electric vehicles. In a typical electric vehicle, a plurality of batteries provide power for propulsion of the vehicle. An inverter converts the DC power provided by the batteries into AC voltages for the phases of the induction motor.

An induction motor can be controlled in "current control" mode or "voltage control" mode. In "current control", the currents provided to the phases of the motor are controlled in a feedback fashion. In "voltage control", the inverter acts as a voltage source without feedback control of the current supplied to the motor.

"Current control" and "voltage control" each have advantages and disadvantages. Current control provides fast response to transient conditions and is insensitive to motor and inverter parameter variations. However, current control typically must reserve a voltage margin to perform current regulation, thus not being capable of using the full DC bus voltage available. This represents a limitation on the average torque achievable from the motor at high speeds, if DC bus voltage is limited.

"Voltage control" is capable of using the full DC bus voltage, thus having high torque capability at high motor speeds, for a given DC bus voltage. However, voltage control can be sensitive to machine and inverter parameters and is typically an average torque control method. Thus, transient torque is somewhat difficult to control.

A system which provides the advantages of both "current control" and "voltage control" while minimizing the disadvantages of each will provide motor-control advantages over the prior art.

SUMMARY OF THE INVENTION

The present invention provides a control method for an induction motor. The control method comprises the step of calculating desired variables for control of the motor according to voltage control. Also, the control method includes the step of calculating desired variables for control of the motor according to current control. Further, the control method comprises the step of applying the desired variables calculated according to voltage control and the desired variables calculated according to current control in relative proportions to control the motor.

The present invention also provides another control method for an induction motor. This control method comprises the step of calculating a first desired quadrature-axis voltage and a first desired direct-axis voltage based on voltage control. The method additionally includes the step of calculating a second desired quadrature-axis voltage and a second desired direct-axis voltage based on current control. Also, the method includes the step of combining the first desired quadrature-axis voltage and the second desired quadrature-axis voltage in relative proportions to generate a commanded quadrature-axis voltage. In addition, the method includes the step of combining the first desired direct-axis voltage and the second desired direct-axis voltage in relative proportions to generate a commanded direct-axis voltage. Further, the method comprises the step of applying the commanded direct-axis voltage and the commanded quadrature-axis voltage to control the induction motor.

The present invention allows for a motor to be controlled with the best features of voltage control and current control. In doing so, the present invention provides advantages in the ability to control an induction motor.

BRIEF DESCRIPTION OF THE DRAWINGS

FIG. 1 is a block diagram of a motor control system according to one embodiment of the present invention.

FIG. 2 is a block diagram of a motor control algorithm performed by motor controller 18 of FIG. 1.

DETAILED DESCRIPTION OF THE PREFERRED EMBODIMENT

Referring to FIG. 1, an induction motor control system according to one embodiment of the present invention is illustrated. The system includes a three-phase induction motor 12 having phases labeled "a", "b" and "c". An inverter 14 converts DC power from battery 16 into the phase voltages at phases "a", "b" and "c". Inverter 14 operates under the control of motor controller 18. Motor controller 18 sends pulse-width-modulated (PWM) switching signals via six circuits 20 to six solid-state switching devices in inverter 14. Motor controller 18 is a microprocessor-based component with sufficient microcomputer resources (throughput, memory, inputs, outputs and the like) to perform the functions ascribed to it herein.

Feedback signals to motor controller 18 include the phase current on phase "a" of the motor ($i_{af}$), the phase current on phase "b" of the motor ($i_{bf}$) and the speed of the rotor of motor 12 ($\omega_r$). Any number of conventional sensors can be used to provide these variables as feedback to motor controller 18, the specific choice of sensors not germane to the present invention.

It is understood that the torque from an induction motor under rotor flux orientation control is described by the following equation:

$$T_e = \frac{3P}{2} \frac{L_m^2}{L_r L_s} \lambda_{ds} i_{qs}, \tag{1}$$

where $T_e$ is torque, P is the number of pole pairs of the motor, $\lambda_{ds}$ is the direct-axis component of stator flux and $i_{qs}$ is the quadrature-axis component of stator current. $L_m$, $L_r$ and $L_s$ are mutual inductance, total rotor inductance and total stator inductance, respectively, for motor 12. Further, direct-axis stator flux of an induction motor is described by the equation:

$$\lambda_{ds} = L_s i_{ds}, \tag{2}$$

where $\lambda_{ds}$ is the direct-axis component of stator flux and $i_{ds}$ is the direct-axis component of stator current.

The algorithm performed by motor controller 18 includes the steps illustrated in FIG. 2. $T_e^*$ is an input to the algorithm. (Note: In this disclosure, a quantity with an asterisk is a desired quantity which is to be controlled to. Quantities with no asterisk are actual quantities.) This desired torque, in the case of an electric vehicle, is primarily a function of the driver's command via the accelerator pedal of the vehicle. Another input to the algorithm is desired stator flux $\lambda_{ds}^*$. For a given desired torque, desired stator flux can be chosen based on a number of criteria. For example, for a given desired torque, desired stator flux can be chosen such that the balance between iron losses in the motor (a function of flux) and copper losses in the motor (a function of current) results in minimum total losses.

At block 100, $T_e^*$ is divided by $\lambda_{ds}^*$. The result is multiplied by $$\frac{2}{3P} \quad \frac{L_s L_r}{L_m^2}$$

(block 102) to get desired stator quadrature-axis current $i_{qs}^*$, in accordance with Equation (1) above. At block 104, $\lambda_{ds}$ is divided by $L_s$, the stator inductance of motor 12, to get desired stator direct-axis current $i_{ds}^*$, in accordance with Equation (2) above.

To perform "current control" of motor 12, $i_{qs}^*$ and $i_{ds}^*$ are compared at difference blocks 106 and 108, respectively, to the feedback values $i_{qf}$ and $i_{df}$. $i_{qf}$ and $i_{df}$ had been obtained from $i_{af}$ and $i_{bf}$ (the feedback phase "a" and phase "b" currents) at blocks 110 and 111. At block 110, $i_{af}$ and $i_{bf}$ are converted from a stationary three-phase domain to a stationary two-phase domain, thus resulting in phase currents $i_{\alpha f}$ and $i_{62 f}$. These phase currents are transformed at block 111 into currents $i_{qf}$ and $i_{df}$, currents which reside in the plane defined by the rotating q- (quadrature) axis and d- (direct) axis. The transformations at blocks 110 and 111 are well-known to those skilled in the art of motor control and will not be discussed in further detail here.

After difference blocks 106 and 108, the resulting differences go to blocks 112 and 113, respectively. Blocks 112 and 113 perform proportional-integral (PI) feedback control. $k_I$ and $k_p$ are the integral and proportional constants, respectively, for the PI control. PI control is only one of numerous ways that the feedback control can be performed. Those skilled in the art can readily contemplate alternative feedback control strategies which are usable in place of PI control.

The outputs of blocks 112 and 113 are $V_{q\_i}^*$ and $V_{d\_i}^*$. These are desired quadrature-axis and direct-axis stator voltages for motor 12 according to "current control". These desired voltages are fed to gain block $G_I$, as will be described below.

It should be emphasized here that blocks 106, 108, 112 and 113 perform a current control function. That is, those blocks take $i_{qs}^*$ and $i_{ds}^*$ as inputs and perform feedback control to try to assure that the actual currents in motor 12 track those desired currents.

$i_{qs}^*$ and $i_{ds}^*$ are also inputs to a "voltage control" function performed by controller 18. At block 114, $i_{qs}^*$ is multiplied by $R_s + \sigma L_s s$, where $R_s$ is stator resistance, $L_s$ is stator inductance, s is the LaPlace operator and $\sigma$ is the total leakage factor for motor 12, defined as:

$$\sigma = 1 - \frac{L_m^2}{L_s L_r}.$$

At block 116, $\lambda ds^*$ is multiplied by $\omega_e$, the synchronous speed of motor 12. The outputs of blocks 114 and 116 are added at summing block 118 to result in $V_{q\_v}^*$, the desired quadrature-axis stator voltage for motor 12 according to voltage control. In total, blocks 114, 116 and 118 execute the following equation to obtain $V_{q\_v}^*$:

$$V_{q\_v} = (R_s + \sigma L_s s) i_{qs}^* + \omega_e \lambda_{ds}^*.$$

At block 120, $i_{ds}^*$ is multiplied by $R_s + \sigma L_s s$. Further, at blocks 122 and 124, $i_{qs}^*$ is multiplied by $\omega_e$, with the result multiplied by $\sigma L_s$. The results of blocks 120 and 124 are fed to difference block 126, the output of which is $V_{d\_v}^*$, the desired direct-axis stator voltage for motor 12 according to voltage control. In sum, blocks 120, 122, 124 and 126 execute the following equation to obtain $V_{d\_v}^*$:

$$V_{d\_v}^* = (R_s + \sigma L_s s) i_{ds}^* - \omega_e \sigma L_s i_{qs}^*.$$

The desired quadrature-axis voltage according to "current control" is then combined with the desired quadrature-axis voltage according to "voltage control". At block 128, $V_{q\_i}^*$ is multiplied by a gain $G_I$. $G_I$ has the following values:

$G_I = 1$ for $\omega_r < \omega_1$, $G_I = 1 - k(\omega_r - \omega_1)$ for $\omega_1 < \omega_r < \omega_2$, $G_I = 0$ for $\omega_r > \omega_2$, where $\omega_1$ and $\omega_2$ are predetermined thresholds of rotor speed. Thus, $G_I$ decreases (preferably but not necessarily linearly) between rotor speed thresholds $\omega_1$ and $\omega_2$. At block 130, $V_{q\_v}^*$ is multiplied by a gain $G_v$. $G_v$ has the following value:

$G_v = 1 - G_I$.

Thus, $G_v$ increases from 0 for $\omega_r \leq \omega_1$ to 1 at $\omega_r \geq \omega_2$. The outputs from blocks 128 and 130 are added at summing node 132. It is therefore seen that $V_{q\_i}^*$ (the desired q-axis stator voltage due to current control) and $V_{q\_v}^*$ (the desired q-axis stator voltage due to voltage control) are combined in relative proportions.

FIG. 2 also illustrates how gains $G_I$ and $G_v$ effect similar blending of $V_{d\_i}^*$ and $V_{d\_v}^*$ at summing node 134.

The outputs of blocks 132 and 134 are thus the following:

$$V_{qs}^* = V_{q\_i}^* * G_I + V_{q\_v}^* * G_v$$

$$V_{ds}^* = V_{d\_i}^* * G_I + V_{d\_v}^* * G_v,$$

where $V_{qs}^*$ is the commanded quadrature-axis stator voltage for motor 12 and $V_{ds}^*$ is the commanded direct-axis stator voltage for motor 12.

With gains $G_I$ and $G_v$ thus applied to $V_{q\_i}^*$ and $V_{q\_v}^*$ and to $V_{di}^*$ and $V_{d\_v}^*$, it is apparent that below rotor speed threshold $\omega_1$, motor 12 is controlled completely in accordance with current control. Above rotor speed threshold $\omega_1$, there is a proportional blending of current control and voltage control, with voltage control becoming increasingly dominant with increasing rotor speed. Finally, above rotor speed threshold $\omega_2$, motor 12 is controlled completely in accordance with voltage control.

The outputs of summing nodes 132 and 134 are then transformed at block 136 into commanded voltages $V_\alpha^*$ and $V_\beta^*$ in the two-dimensional stationary reference frame. At block 138, these voltages are converted to PWM signals for the six circuits 20 which control the six switching devices in inverter 14. Such conversion to PWM is well-known in the art and can take the form of "space vector" PWM or other methods.

One further portion of the block diagram of FIG. 2 should be pointed out. At block 140, the slip speed $\omega_{sl}$ is calculated as:

$$\omega_{sl} = \frac{1}{T_r} \quad \frac{i_q^*}{i_d^*},$$

where $T_r$ is the rotor time constant of motor 12. At summing block 142, $\omega_{sl}$ is added to $\omega_r$, the rotor speed of motor 12, to get $\omega_e$, the synchronous speed of motor 12. This synchronous speed is used in the algorithm at block 116, as previously described. Also, $\theta_e$, the electrical angle of motor 12, is calculated through integration of $\omega_e$ at block 144. $\theta_e$ is used as a reference for the transformations which take place at blocks 111 and 136.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A control method for an induction motor comprising the steps of:
   (a) calculating desired variables for control of said motor according to voltage control;
   (b) calculating desired variables for control of said motor according to current control;
   (c) applying said desired variables calculated according to voltage control and said desired variables calculated according to current control in relative proportions to control said motor;
wherein said relative proportions are functions of a motor operating condition.

2. A control method as recited in claim 1 wherein said motor operating condition is motor speed.

3. A control method as recited in claim 2 wherein for at least a predetermined motor speed range, the relative proportion of voltage control increases with motor speed.

4. A control method for an induction motor comprising the steps of:
   (a) calculating a first desired quadrature-axis voltage and a first desired direct-axis voltage based on voltage control;
   (b) calculating a second desired quadrature-axis voltage and a second desired direct-axis voltage based on current control;
   (c) combining said first desired quadrature-axis voltage and said second desired quadrature-axis voltage in relative proportions to generate a commanded quadrature-axis voltage;
   (d) combining said first desired direct-axis voltage and said second desired direct-axis voltage in relative proportions to generate a commanded direct-axis voltage; and
   (e) applying said commanded direct-axis voltage and said commanded quadrature-axis voltage to control said induction motor.

5. A control method as recited in claim 4 wherein said relative proportions are functions of speed of the motor.

6. A control method as recited in claim 5 wherein for at least a predetermined motor speed range, said relative proportions more heavily favor voltage control as speed of the motor increases.

7. A control method as recited in claim 6, wherein the commanded quadrature-axis voltage $V_q^*$ and the commanded direct-axis voltage $V_d^*$ are calculated as follows:

$$V_q^* = V_{q\_i}^{} G_I + V_{q\_v}^{} G_V$$

$$V_d^{} = V_{d\_i}^{} G_I + V_{d\_v}^{**} G_V$$

wherein $V_{q\_v}^*$ and $V_{d\_v}^*$ are said first desired quadrature-axis voltage and said first desired direct-axis voltage, respectively;

wherein $V_{q\_i}^*$ and $V_{d\_i}^*$ are said second desired quadrature-axis voltage and said second desired direct-axis voltage, respectively;

wherein $G_V = 1 - G_I$;

wherein below a first motor speed threshold $\omega_1$, $G_I = 1$;

wherein above a second motor speed threshold $\omega_2$, $G_I = 0$; and wherein between said thresholds $\omega_1$ and $\omega_2$, $G_I$ decreases with increasing motor speed.

8. A control method as recited in claim 7, wherein said decrease of $G_I$ is linear.

* * * * *